US005291243A

United States Patent [19]
Heckman et al.

[11] Patent Number: 5,291,243
[45] Date of Patent: Mar. 1, 1994

[54] SYSTEM FOR ELECTRONICALLY PRINTING PLURAL-COLOR TAMPER-RESISTANT DOCUMENTS

[75] Inventors: Dean A. Heckman, Palmyra; Steven R. Tuttle, Rochester; Irshad H. Qureshi, Fairport, all of N.Y.

[73] Assignee: Xerox Corporation, Stamford, Conn.

[21] Appl. No.: 14,474

[22] Filed: Feb. 5, 1993

[51] Int. Cl.$^5$ .................. G03G 21/00; G09C 5/00
[52] U.S. Cl. ................... 355/201; 346/157; 355/326 R; 380/54; 380/55
[58] Field of Search ............ 355/200, 201, 202, 326, 355/327; 346/153.1, 157, 60; 380/54, 55

[56] References Cited

U.S. PATENT DOCUMENTS

| | | |
|---|---|---|
| 481,770 | 8/1892 | Schlumberger . |
| 592,533 | 10/1897 | Roger et al. . |
| 776,470 | 11/1904 | Ives . |
| 1,457,805 | 6/1923 | Woodhull . |
| 1,564,724 | 12/1925 | Todd et al. . |
| 2,065,605 | 12/1936 | Moore .................. 283/9 |
| 3,282,720 | 11/1966 | Oleksiw ................ 117/1 |
| 3,675,948 | 7/1972 | Wicker ................. 283/6 |
| 4,168,088 | 9/1979 | Somlyody .............. 283/8 |
| 4,175,774 | 11/1979 | Tonges et al. ......... 283/6 |
| 4,210,346 | 1/1980 | Mowry, Jr. et al. ..... 283/8 |
| 4,227,719 | 10/1980 | McElligott et al. ..... 283/8 |
| 4,227,720 | 10/1980 | Mowry et al. ......... 283/8 |
| 4,234,214 | 11/1980 | Lee .................... 283/57 |
| 4,265,469 | 5/1981 | Mowry et al. ......... 283/8 |
| 4,277,514 | 7/1981 | Sugiura et al. ........ 427/1 |
| 4,310,180 | 1/1982 | Mowry, Jr. et al. ..... 283/8 |
| 4,520,063 | 5/1985 | Simon et al. ......... 428/195 |
| 4,579,370 | 4/1986 | Corwin et al. ........ 283/72 |
| 4,733,887 | 3/1988 | Mowry, Jr. ........... 283/58 |
| 4,891,666 | 1/1990 | Gordon ............... 355/133 |
| 4,903,048 | 2/1990 | Harrington .......... 346/157 |
| 4,908,873 | 3/1990 | Philibert et al. ...... 355/201 X |
| 4,980,719 | 12/1990 | Allen et al. ......... 355/201 |
| 5,077,795 | 12/1991 | Rourke et al. ........ 355/201 X |
| 5,078,428 | 1/1992 | Maeno ................ 283/93 |
| 5,144,369 | 9/1992 | Benedict et al. ...... 355/245 |
| 5,171,040 | 12/1992 | Orndorff ............. 283/93 |
| 5,178,418 | 1/1993 | Merry et al. ......... 283/73 |
| 5,193,853 | 3/1993 | Wicker ............... 283/85 |
| 5,197,765 | 3/1993 | Mowry, Jr. et al. .... 283/93 |
| 5,216,724 | 6/1993 | Suzuki et al. ........ 355/201 X |

FOREIGN PATENT DOCUMENTS

0453594 10/1991 European Pat. Off. .... G03G 15/00

OTHER PUBLICATIONS

Reexamination Certificate, B14,175,774, "Non-Copying Printing Printed Document & Method of Printing Same" by Gerald Torges, et al., certificate issued Apr. 28, 1987.

*Proceedings of the International Conference on Lasers '90,* "Digital Halftoning Algorithms and Parameters", by K. T. Knox, pp. 619–625.

*Primary Examiner*—Fred L. Braun

[57] ABSTRACT

A system for printing security documents which have copy detection or tamper resistance in plural colors with a single pass electronic printer printing an integrated image controlled by an image generation system which electronically generates a safety background image pattern with first and second interposed color patterns which is electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which becomes visible when copied, and/or are machine readable even in copies.

18 Claims, 11 Drawing Sheets

SYSTEM FOR ELECTRONICALLY PRINTING PLURAL-COLOR TAMPER-RESISTANT DOCUMENTS

Disclosed in an improved and more efficient system for electronically printing tamper-resistant plural-color documents. The disclosed system can digitally form and integrate into one printed "security document" an integrated variable image of both finely intermixed plural colors in a "safety" background and variable alphanumeric or other information, such as amounts of money, names, signatures, etc. This composite image can be printed on demand, in a single pass of the paper or other substrate, preferably in an appropriate electronic printer as described herein, so as to eliminate the problems and dangers of conventional security document printing systems requiring pre-printed "safety paper".

Although no security printing system can fully protect against determined forgers, or careless users, a variety of methods are known in the art for attempting to hinder and/or help detect forgery, alteration or duplication of sensitive documents such as negotiable instruments, especially checks and bank drafts. Other examples of documents for which resistance to forgery, copying, or other tampering is desired include stock or bond certificates, driver's licenses, identification cards or papers, passports, betting slips, prize or game awards, tickets, or documents that simply require validating signatures to be affixed thereto, such as electronically negotiated and/or transmitted contracts, etc.

Negotiable instruments and other such security documents are now typically over-printed on expensive, pre-printed "safety paper" that has a pre-printed background pattern which is not readily reproducible by a copy machine or the like. The pertinent negotiable information of the instrument must be subsequently printed in a separate printing operation onto this pre-printed safety paper. Other tamper-resistance schemes include printing pertinent information such as names and numbers, especially amounts of money, in a form that is not amenable to alterations, such as with paper perforations, overprints, further background patterns, or other additional treatments. However, that can add even further printing or processing steps and expanse, especially if adding another color is utilized.

"Due diligence" requirements for making checks reasonably safe from check alteration are reportedly the subject of a recent U.S. Supreme Court decision and Uniform Commercial Code Sections 3-406 and 4-406(e) and (d).

The advent of high resolution color copying machines have provided forgers with an increased facility with which to reproduce even plural color secure documents (even bank notes or currency). Consequently, safety paper desirably has an effective halftone pattern density (fineness) above a color copier's resolution threshold, thus advantageously exploiting the limitations of color copy machines. It is also reportedly known in the art to use multi-colored safety paper stock with pastel colors that shade into one another that color copiers cannot accurately duplicate. However, printing more than one interspersed color normally presents image registration and/or image merger problems, as further noted below.

Further by way of background, as noted, negotiable instruments were heretofore typically created in a separate two-step process. Briefly, the process begins by creating blank safety paper which is pre-printed, typically on an offset printing press. As a subsequent second step the negotiable information is printed on the safety paper. That second step may now use electronic xerographic printing machines, such as the Xerox Corporation "9700" laser printer. Creating the blank safety paper which is used in an attempt to copy-proof negotiable instruments is accomplished by imprinting thereon a background pattern, examples of which are disclosed in the following U.S. Pat. Nos. 2,065,605 to Moore; 481,770 to Schlumberger; and 4,520,063 to Simon et al. Safety paper can have a background pattern with multiple colors, as taught by U.S. Pat. Nos. 776,470 to Ives; 3,675,948 to Wicker; 4,277,514 to Sugiura et al; and 1,457,805 to Woodhull.

Additionally, embedded in the background pattern of the safety paper may be a latent mark or word such as "VOID" that becomes visible or legible upon attempted reproduction on machines such as xerographic photocopiers. The latent mark may be formed, for example, by using dots at a first density embedded in a background pattern using dots of a second density. The two densities vary enough to keep the latent word invisible to the human eye on the original, but not enough to keep copying machines from distinguishing between the two densities upon reproduction, and emphasizing or increasing them, so as to make the latent word such as "VOID" visible on copies. Disclosures of a latent mark in a background pattern of safety paper for use as a copying indicator include U.S. Pat. No. 4,168,088 to Somlyody; 4,265,469; 4,227,720; 4,310,180; 4,210,346 to Mowry, Jr. et al.; 4,227,719 to McElligott et al.; 4,891,666 to Gordon; 5,078,428 to Maeno; and 4,597,370 to Corwin et al.. Noted for a taped-on area density highlighting change is published European Patent Application 0 453 594 A1. As also disclosed in the above-cited United States Patents, and in particular, U.S. Pat. No. 4,175,774 to Tonges et al., safety paper is typically printed separate from most of the negotiable information imprinted thereon with a specially designed printing plate.

After printing such safety paper having a copy-proof background pattern, and a latent mark embedded within the background pattern, information pertaining to the particular negotiable instrument(s) is subsequently printed thereon, such as the monetary value for a check. This information is desirably written using alphanumeric characters with a high degree of legibility, while at the same time providing a high degree of protection against any attempted alteration thereof. One technique, such as is disclosed in U.S. Pat. No. 1,564,724 to Todd et al., protects each alphanumeric character with a surrounding background pattern of relatively small characters with comparatively small type. This requires successful alterations of characters to include the alteration of each small scale character embedded in the background pattern of a single character. Additional schemes to make altering pertinent information on negotiable instruments difficult include U.S. Pat. Nos. 592,533 to Rogers et al, 4,234,214 to Lee and 4,733,887 to Mowry et al..

Similarly to other alphanumeric characters on negotiable instruments, signatures that appear on these and other important documents may also desirably provide protection against alterations. U.S. Pat. No. 3,282,720 to Oleksiw teaches a method of applying validating signatures to negotiable instruments. A signature imprint that defines a partial background is first applied to a negotiable instrument, and then, at the time the negotiable instrument is to be validated and issued, an imprint to complete the partial background is applied.

Although U.S. Pat. No. 5,178,418 issued Jan. 15, 1993 to T. Merry, et al., on security background patterns says in Col. 3 that: "Computer-generated imaging is well known in the security printing industry . . . " it does not teach anything about how to do so, or cite any references that do, nor did the U.S. PTO in that patent.

As noted, the ease and extent to which negotiable instruments can be forged has also proliferated because of color copiers. However, most color copiers form images using combinations of cyan, magenta, yellow and/or black toner in separate passes. The limitations of such conventional color copiers or printers can be used as a means for detecting forgery. The fact that each color application typically requires a separate pass through the printing process causes paper and image registration problems. As a result, each color on a copy is normally not perfectly registered with the original or one another. Such copiers have particular difficulty in this regard where there are fine patterns of intermixed colors, as is desired in safety documents. As previously noted, color copies may also make detectable errors in the reproduced colors, in hue, saturation, and/or chromanance.

The present system exploits this limitation of normal color copiers by providing much easing printing of protected negotiable and other instruments on a special plural color copier having single pass printing and "perfect registration" even of finely intermixed color patterns, thereby reducing the ease of copier forgery with conventional color copiers.

A preferred printer and its imaging controls that can provide such "perfect registration" is the Xerox Corporation "4850" "Highlight Color Laser Printing System" product, commercially available since September 1991. The "4850" has single-pass two color "perfect registration", with the ability to print an integral image of interdigitated pixels of the two colors. That printer has a tri-level xerographic system, as further explained, inter alia, in Xerox Corporation U.S. Pat. Nos. 5,144,369; 4,811,046; and 4,847,655; and additionally in U.S. Pat. Nos. 5,157,441; 5,138,378; 5,119,131; and 5,132,730. Particularly noted re providing such interdigitated color pixels of alternating colors and varying white or unprinted spaces (difficult to produce on other copiers or printers) is Xerox Corporation U.S. Pat. No. 4,903,048, issued Feb. 20, 1990 to S. J. Harrington.

However, it will be appreciated that other electronic printers and/or image generation and/or transfer devices and/or marking materials may be alternatively utilizable if they can provide comparable printing requirements. For example, it may be possible that a high resolution [e.g., 600 spots per inch or 150 spots per mm] ink jet printer, with an integral or common two-color (two ink) printing head with closely adjacent respective ink jet orifices for the two [or more] respective colors, could provide single-pass printing with sufficiently accurate or "perfect registration" for the unique function, application and resultant tamper-resistant patterned articles of manufacture disclosed herein. A two-color, single-head, ink jet printing head is disclosed in Xerox Corporation U.S. Pat. Nos. 4,620,198 and 4,899,181.

For certain applications, negotiable instruments also require the printing thereon of magnetically readable magnetic ink ("MICR") alphanumerics. This is well known for bank checks printing, and the like, including xerographic MICR check printing. These include the machine-readable numbers conventionally printed along the bottom of checks. Such MICR printing "inks" may be used as the xerographic toner or image developer material for one or more of the different colored "inks" which may be used in the system described herein, or used in a prior or subsequent separate printing operation of documents already printed protectively as described herein. Some examples of MICR printing patents include Xerox Corporation U.S. Pat. Nos. 5,102,755; 4,859,550; 4,563,086; 4,517,268; and U.S. Pat. No. Re. 33,172.

It is important to note that there is a significant danger in the theft and misuse of blank (only background pre-printed) "safety paper" as it is transferred and stored, before it is used. The danger is well recognized in the art.

The accounting, secure storage, and other security measures for unused or "blank" safety paper to prevent theft are a significant cost burden in themselves. That is, not only is the pre-printed safety paper now used for negotiable instruments costly to make, it incurs additional costs such as special storage and transportation costs. It also has waste and reprinting costs due to unforeseen changes to personalized printings, or desired security changes. The unavailability of sufficient quantities of the correct safety paper at a document printing site can even delay the printing of the desired instruments, which can be a serious business or legal problem.

Thus, it would be highly advantageous for negotiable instruments and the like to be generated on demand without requiring special paper supplies of pre-printed safety background paper. It would also be desirable to have a versatile system that digitally generates and integrates safety paper for negotiable instruments with the negotiable information appearing on the safety paper, for integral printing. The present system provides this.

The system described herein may desirably employ known systems and software for image generation, workstations or terminals, and printer controls. By way of examples, and background, systems that digitally form images for transmittal to printers are described in the following Xerox Corporation U.S. Pat. Nos. 5,153,577; 5,113,517; 5,072,412; 5,065,347; 5,008,853; 4,947,345; 4,939,507; 4,937,036; 4,899,136; 4,531,239; 3,958,088; and 3,920,895; Fuji Xerox Co. U.S. Pat. No. 5,113,355; and IBM Corp. U.S. Pat. No. 4,651,278. Also, noted for examples of printer controls are Xerox Corporation U.S. Pat. No. 5,133,048, and the October 1990 publication "The Xerox DocuTech ® Production Publisher " from BIS CAP International, Newtonville, Mass, by Charles LeComte. Noted also are Xerox Corporation U.S. Pat. No. 5,170,340, and allowed U.S. Ser. No. 07/591,324, filed Sep. 28, 1990, now U.S. Pat. No. 5,175,679, on networking thereof. Additionally noted is the Xerox printing productivity series: Elixir Edition for Highlight Color, that includes ElixiForm/ElixiSys, ElixiGraphics and ElixiFont, further discussed hereinbelow.

The Federal Circuit has held that if a microprocessor is indicated in the specification, one skilled in the art would know how to perform the necessary steps or desired functions described in the specification, and is not required to disclose actual software or firmware for 35 USC §112 disclosure support. In re Hayes Microcomputer Products Inc. Patent Litigation (CA FC 12/23/92).

Further by way of background, known electronic printing standards includes a specific set of instructions for printing, in a standard for representing documents digitally. The "Interpress ™" standard for representing printed pages, for example, is already supported by a wide range of Xerox Corporation and other products. The print service understands and processes "Interpress ™" instructions received from a workstation, transforming them into a format understood by the printer. The Interpress ™ standard is comprehensive; it can represent any images that can be applied to paper (including complex graphics) and a wide variety of font styles and characters. This allows a user to easily produce new masters and allows the printer to selectively print pages from any master it receives. The "Interpress ™" master is also accompanied by properties and options which specify document name, color, and creation date. The print service interprets the master and then directs the printer during the printing process.

Workstations on the network can interact with the print service. This software runs automatically when users request that a document be printed. It converts the document format used by the workstation into an "Interpress ™" master which is transmitted to the print service.

Utilizing an inter-network routing service, users can transmit "Interpress ™" or other printing masters through a network and then across an internet, typically, via telephone lines, twisted pair wires, coaxial cables, microwaves, infrared, and/or other data links, allowing documents created in one location to be automatically routed to a print service and printer hundreds or even thousands of miles away, in seconds or minutes. This has obvious business advantages for the remote generation or printing of security documents, which can be utilized by the system herein.

A specific feature of the specific embodiment disclosed herein is to provide a plural-color printing system for printing plural color security documents with a printed image resistant to reproduction or alteration with an electronic printer printing an integrated image of the security document in a single pass, said single-pass electronic printer being controlled for said forming of said integrated security document image by an image generation system which electronically generates a safety background image pattern with at least a first color pattern and a second color pattern, said first color pattern being interposed with said second color pattern to form an interposed plural color pattern, and said image generation system further providing and electronically merging alphanumeric information interposed with said safety background image pattern for said printer to print said integrated image security document in a single pass.

Further specific features provided by the system disclosed herein, individually or in combination, include those wherein the single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which becomes visible when copied, and/or are machine readable even in copies.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the examples below, as well as the claims. Thus, the present invention will be better understood from this description of embodiments thereof, including the drawing figures (approximately to scale) wherein:

Figure 4:
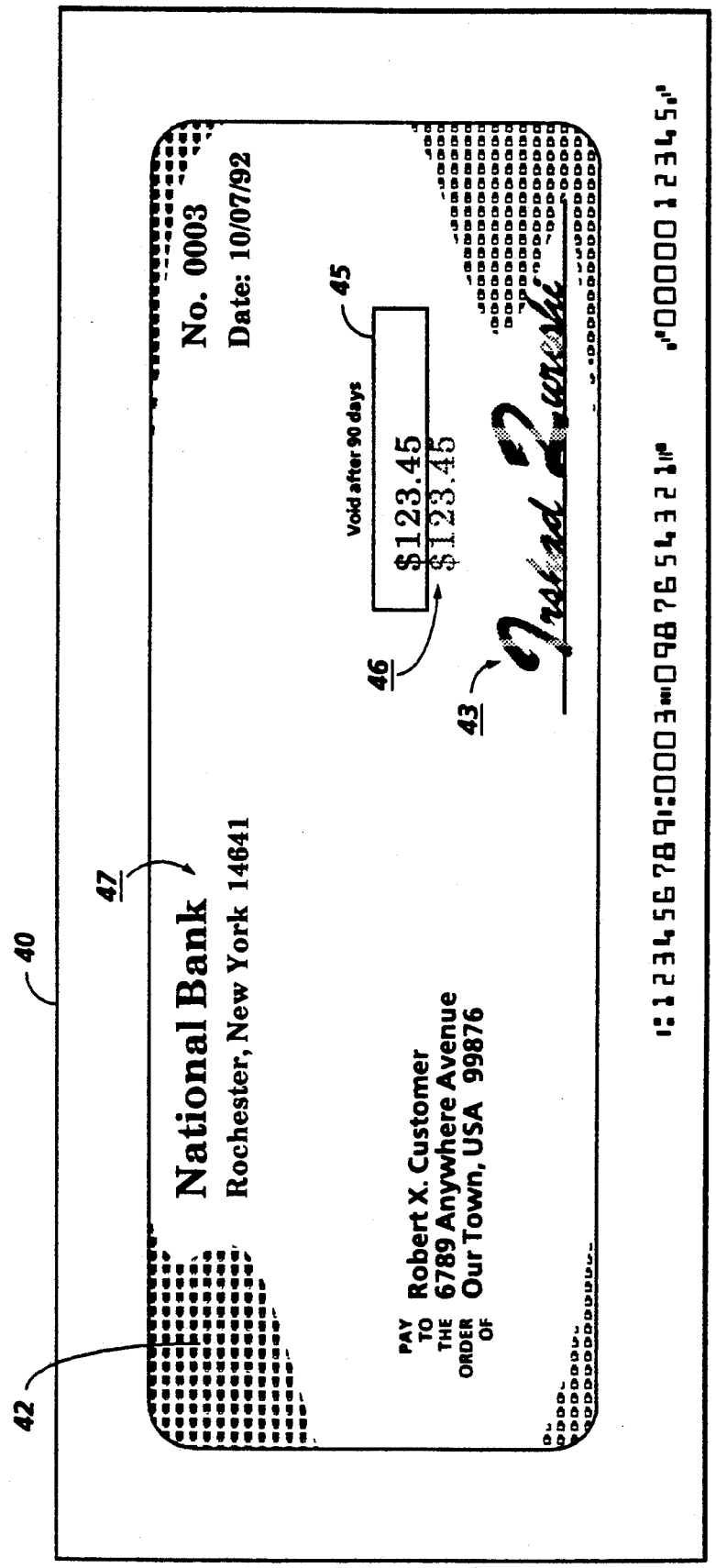
FIG. 4 is an exemplary check showing various exemplary protective elements of that particular negotiable instrument example which may be generated and printed by the system of FIGS. 1-3.
Figure 5:
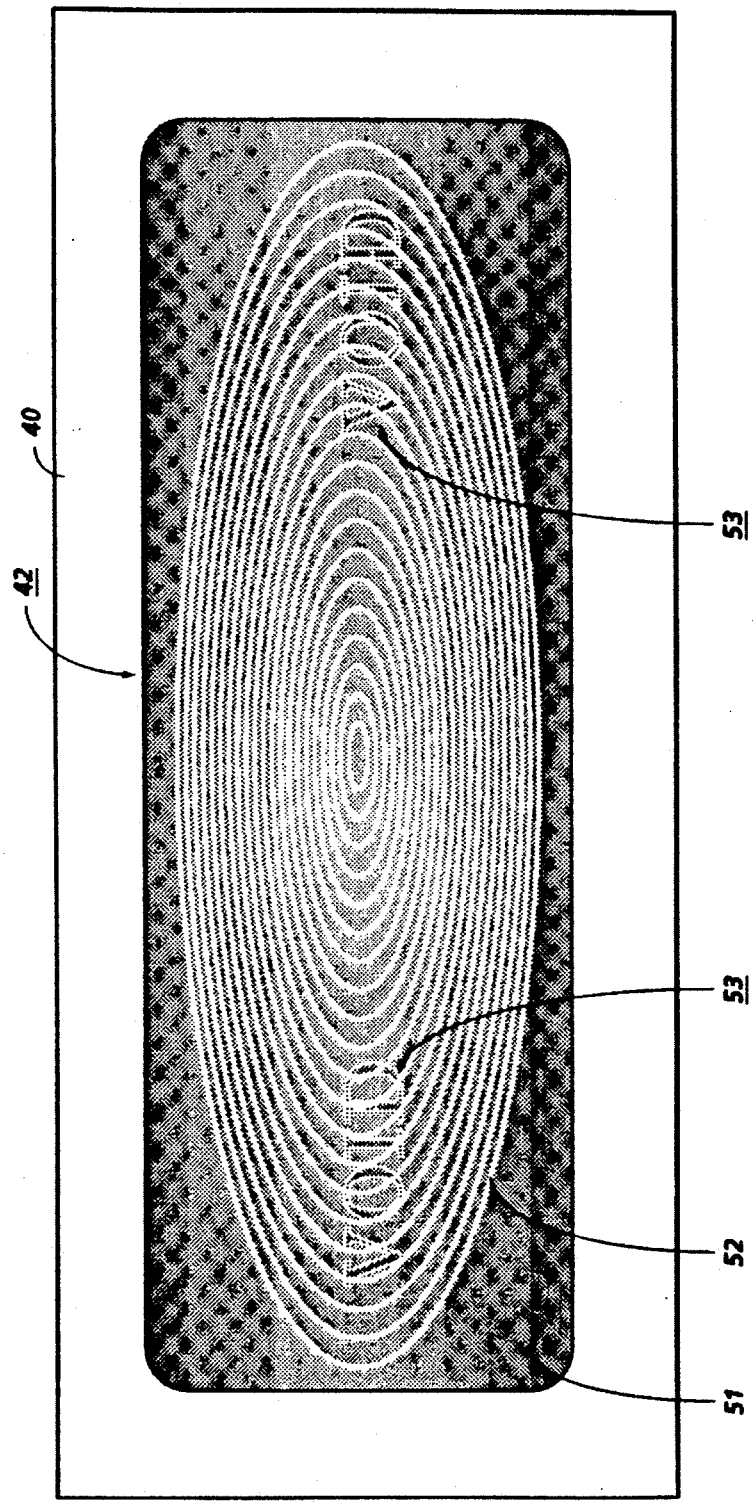
Figure 6:
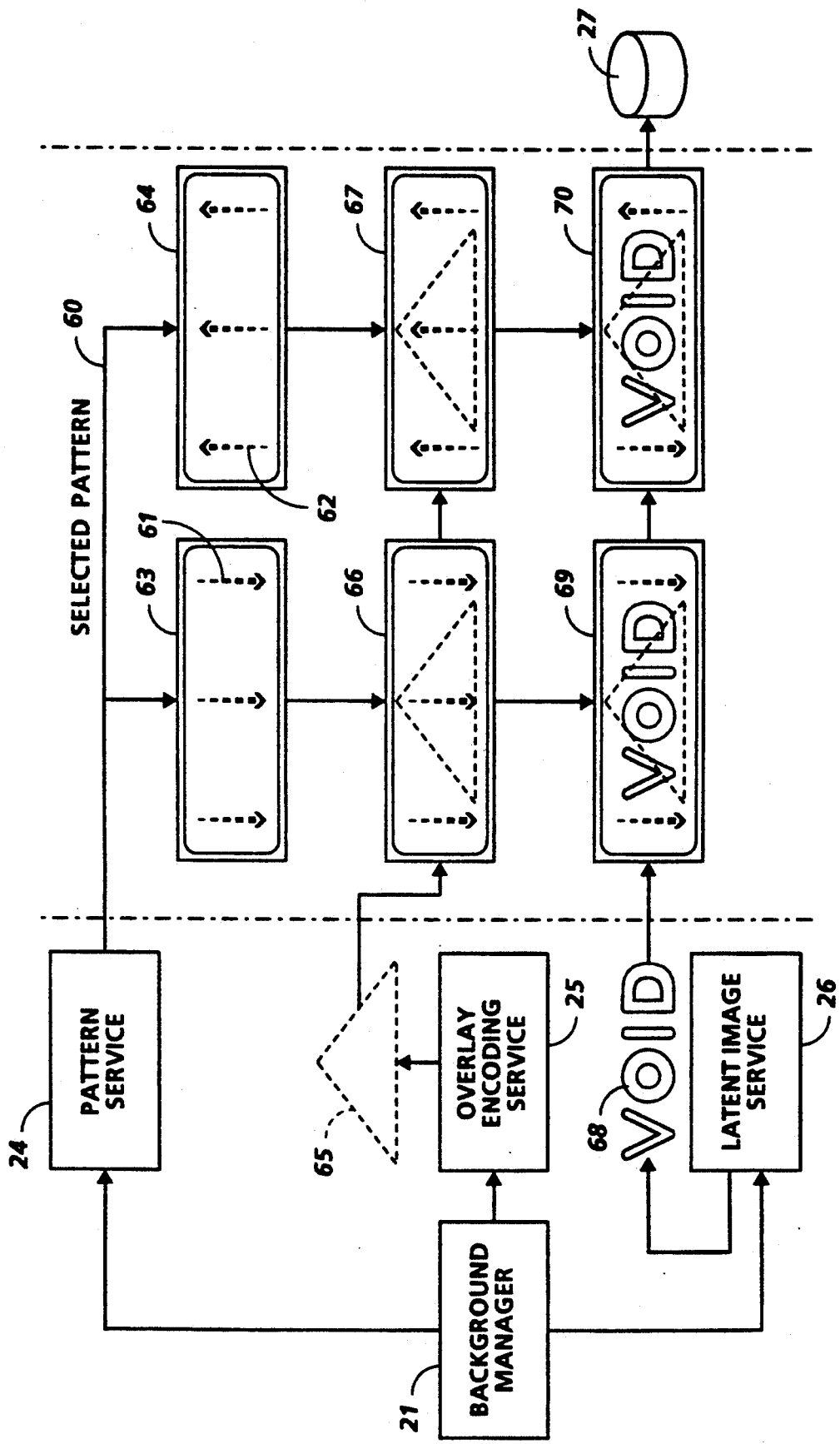
Figure 7:
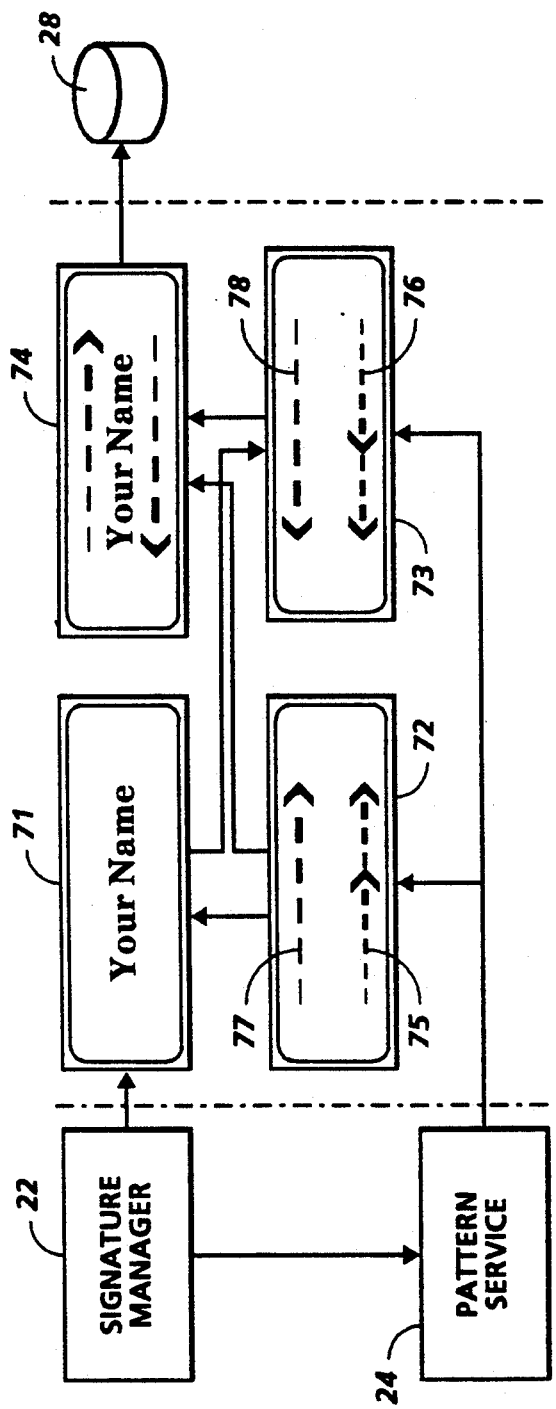
Figure 8:
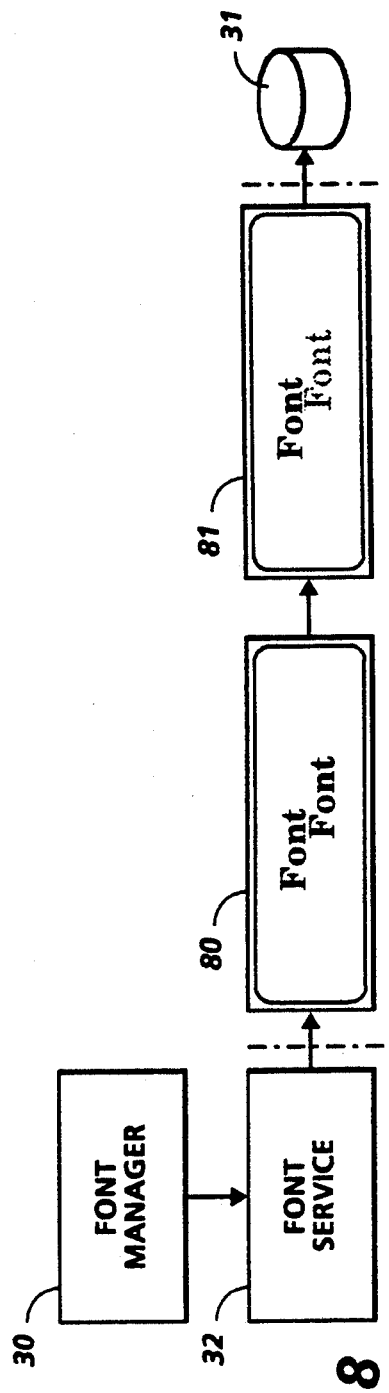
Figure 9:
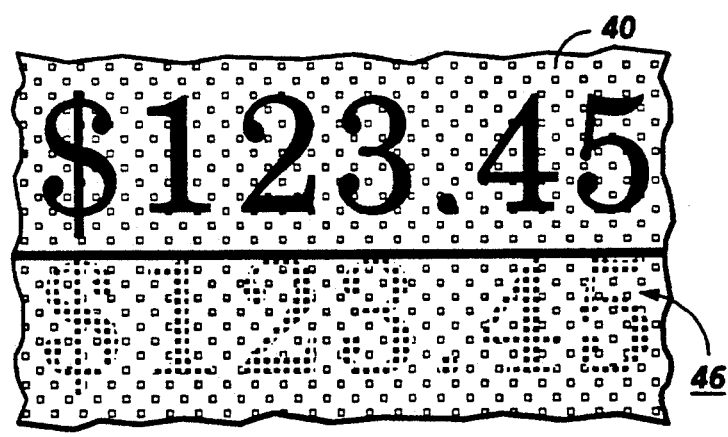
Figure 10A:
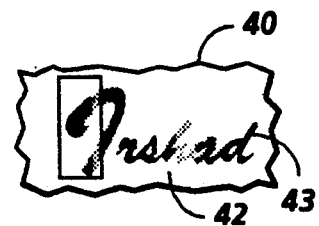
Figure 10B:
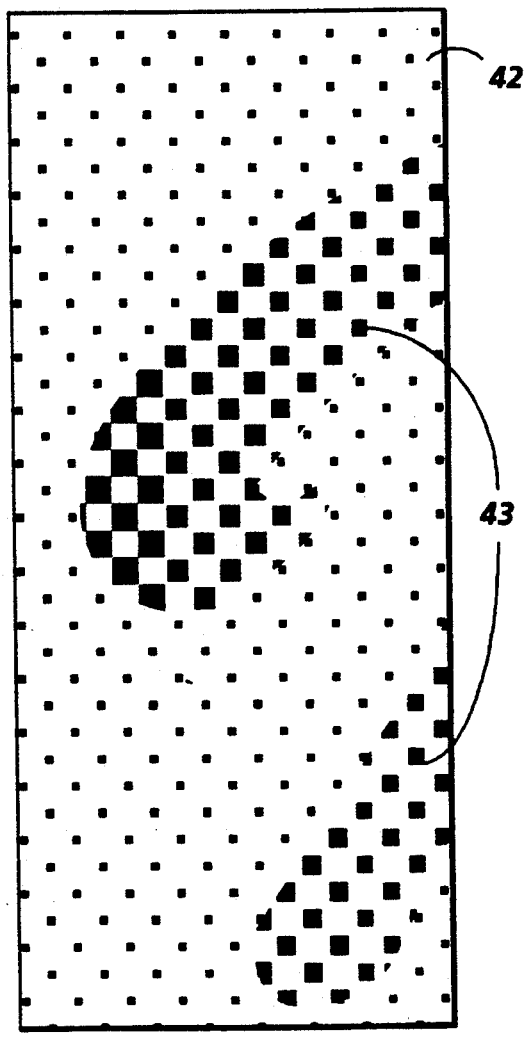
Figure 11:
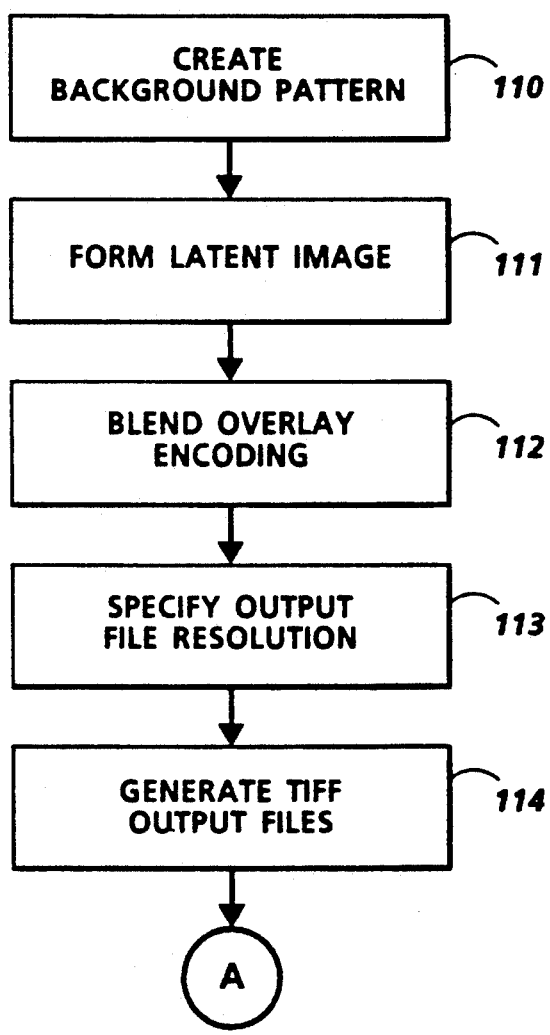
Figure 12:
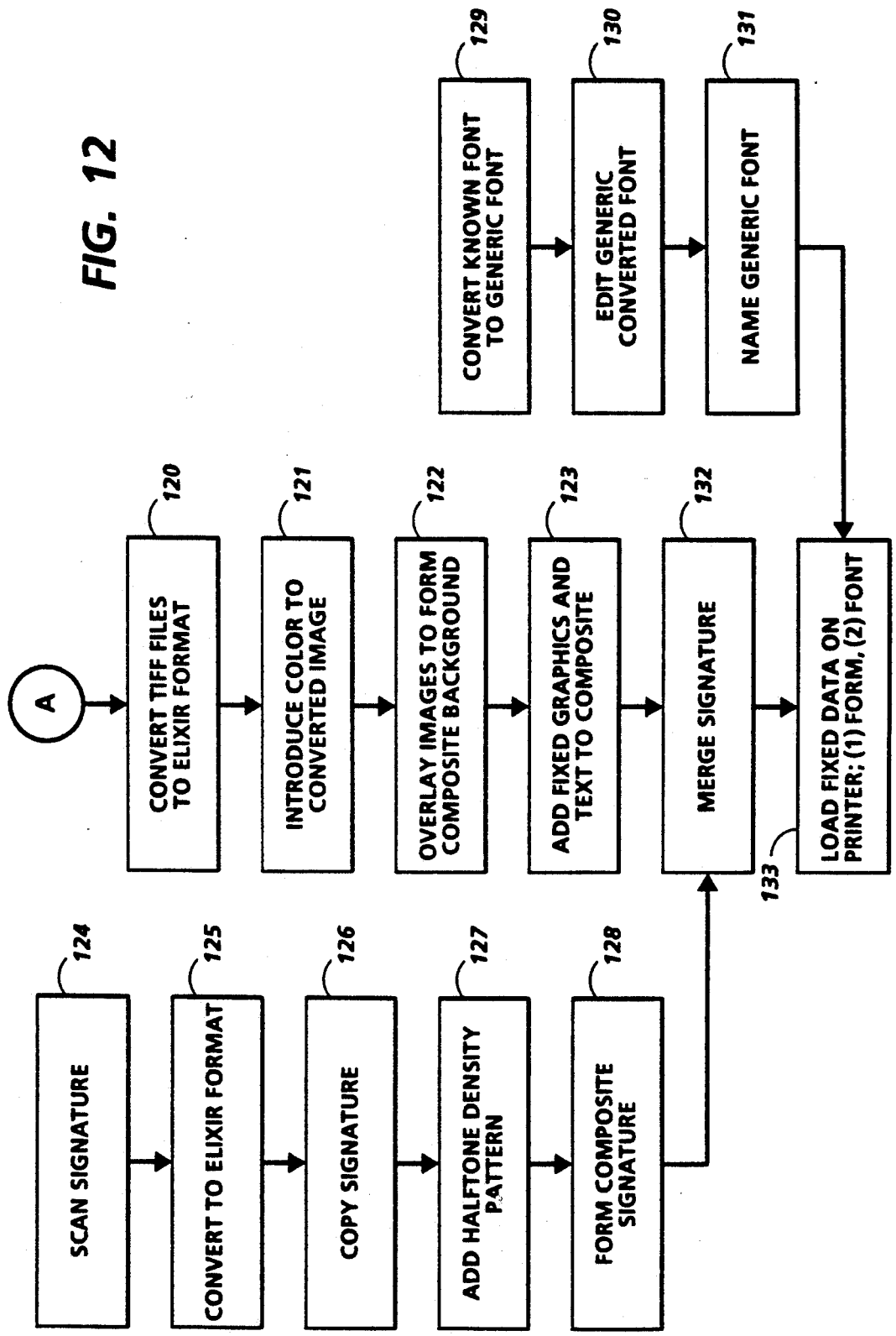

FIG. 5 separately illustrates the general background, per se, of the check shown in FIG. 4, specifically illustrating one example of such a safety background;

FIG. 6 is a block diagram illustrating one example of how to additionally generate "VOID" (or another such latent image background element) in a security image background for copying detection;

FIG. 7 is a block diagram illustrating one example of how to generate a validating signature of a negotiable instrument, such as the signature shown in FIG. 4;

FIG. 8 is a block diagram illustrating how to generate a secure custom font for use with a negotiable instrument, such as the low density "echo" or "shadow" repeated amount number shown in the check of FIG. 4;

FIG. 9 is an illustrative example of such a secure custom font, comprising that magnified portion of the check of FIG. 4 (the currency amount number);

FIGS. 10A and 10B shows a magnified portion of the protected signature image on the check of FIG. 4;

FIG. 11 is a schematic flow chart of an exemplary software security image creation system illustrating the steps taken to generate a background pattern in this alternative embodiment; and FIG. 12 is a flow chart continued from FIG. 11, using a different software, illustrating the steps taken to generate a background pattern.

Figure 1:
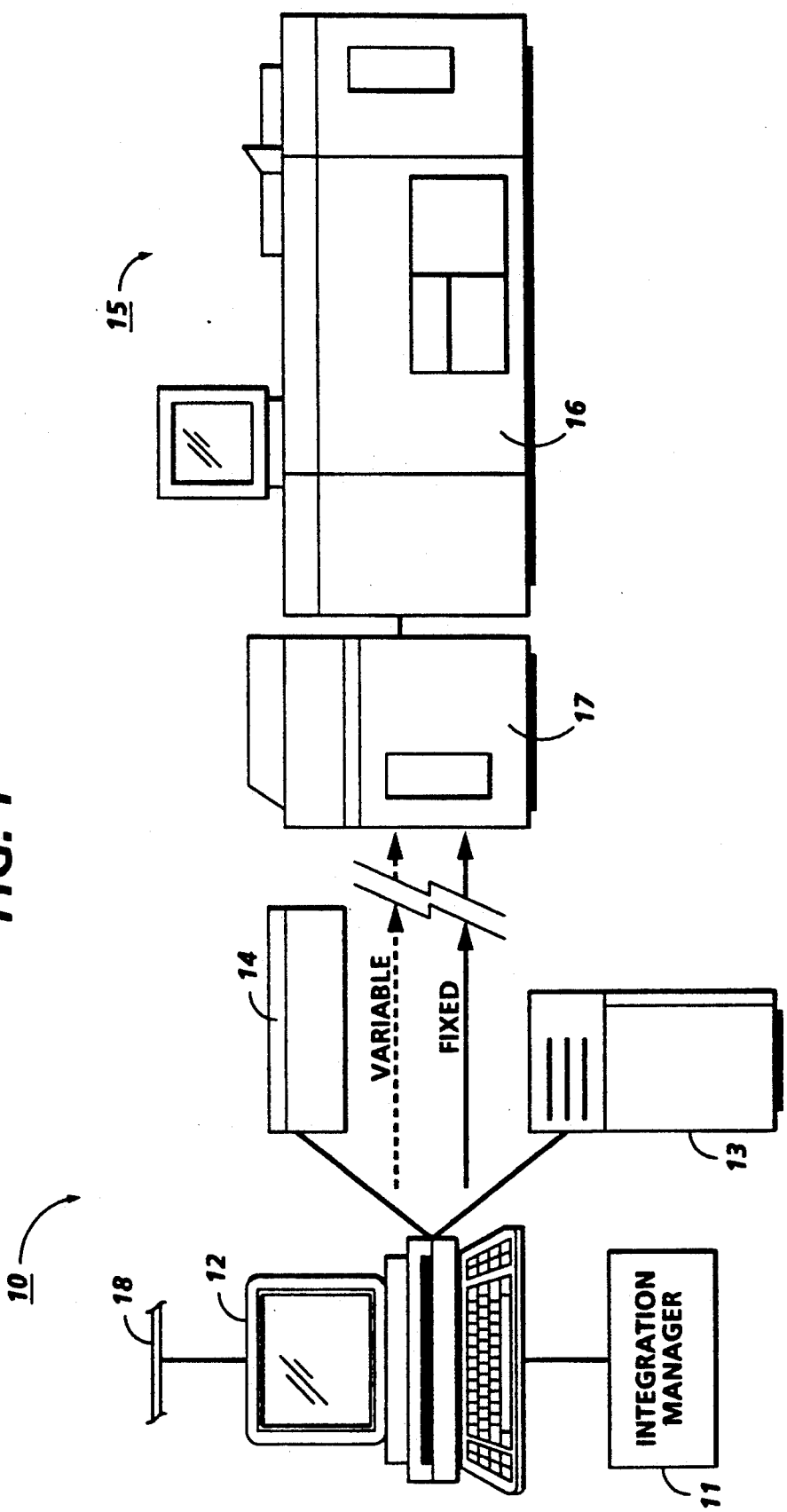
FIG. 1 is a schematic view depicting one example of components of an exemplary electronic publishing system with a two-color printing machine adapted to print negotiable instruments or the like in accordance with the present invention.

Describing now in further detail the exemplary embodiment with reference to the Figures, there is shown in FIG. 1 an exemplary negotiable instrument or other security document production system 10 that is controlled by integration manager 11 and includes a workstation 12 connected to a storage device 13, scanner 14 and printer 15, all of which can be stand-alone units, or connected for communication over a network 18 with each other and/or other elements such as a remote auxiliary storage device (not shown). Integration manager 11 digitally forms and integrates various parts of a negotiable instrument in an automated manner.

Figure 2:
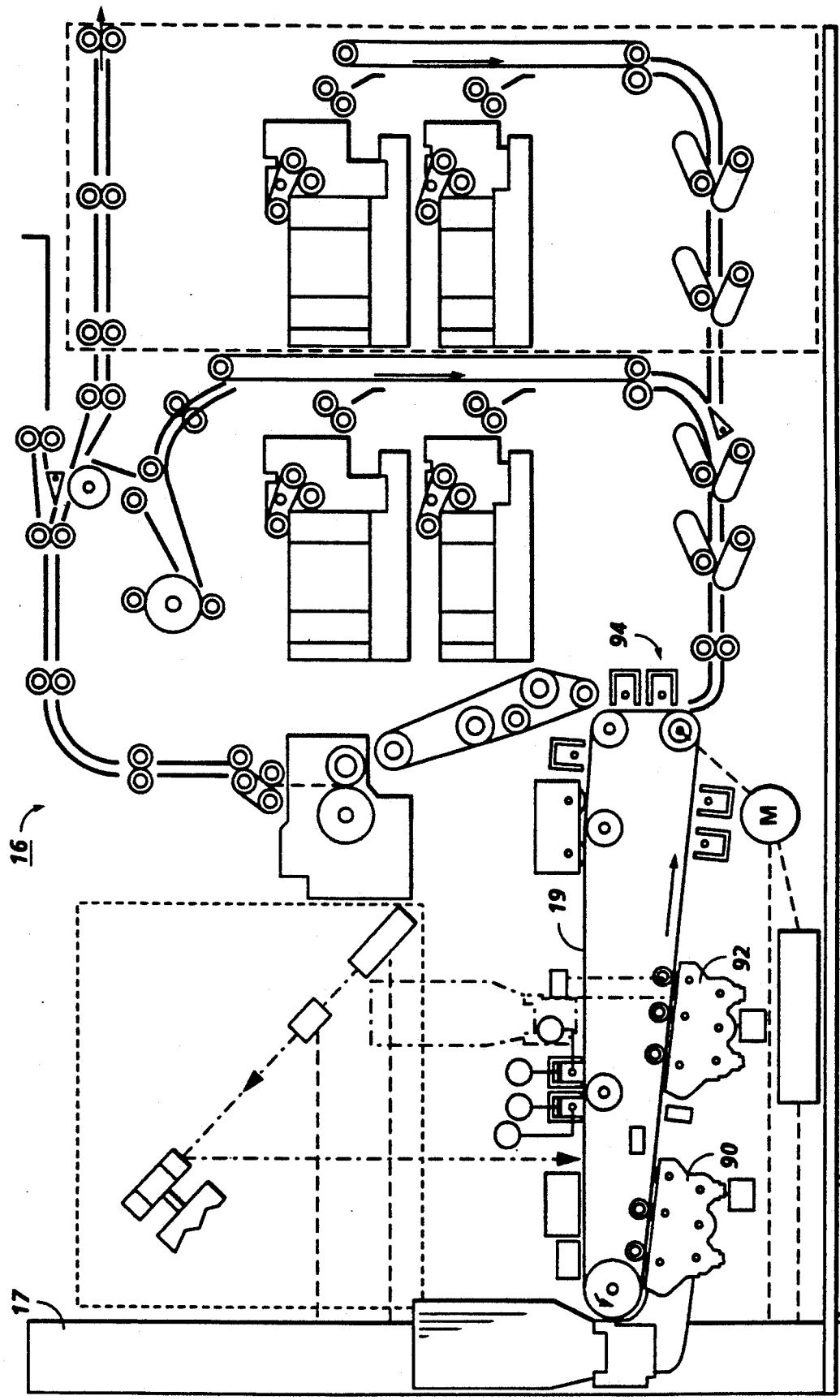
FIG. 2 is a schematic plan view illustrating the principal internal operating components of the exemplary two-color printing machine of FIG. 1.

Shown in FIG. 4 is one example of a printed negotiable instrument and its various image elements (two of which are magnified in FIGS. 9 and 10), discussed in detail below. This example is a check 40. The manager 11 electronically integrates the parts of the image of check 40 in a manner that will optimize the effective use of the printer 15. The printer 15 includes an image output terminal (IOT) 16 shown in more detail in FIG. 2 and an electronic subsystem (ESS) input 17. The printer 15 is preferably a single pass color xerographic printer, here the Xerox Corporation "4850" tri-level highlight printer further disclosed in the above-cited Xerox Corporation U.S. Pat. Nos.: 4,811,046; 4,847,655; 4,903,048; 5,119,131; 5,132,730; 5,138,378; 5,144,369; and 5,157,441.

Figure 3:
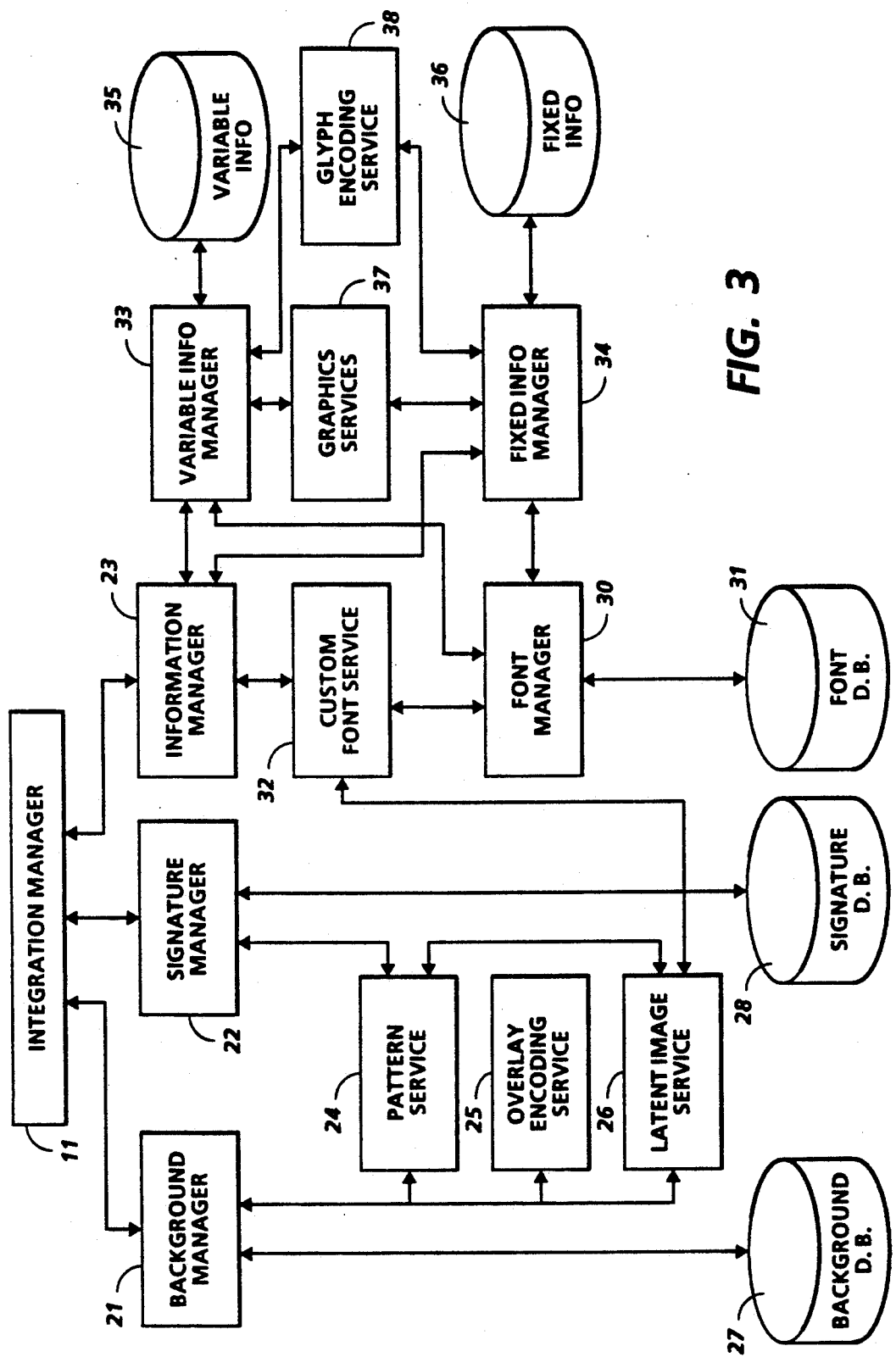
FIG. 3 is a block diagram illustrating the principal elements of an exemplary negotiable instrument document production system which may be utilized in the system of FIGS. 1 and 2.

One example of the integration manager 11, which operates or in an automated manner on a conventional workstation 12, is shown in more detail in FIG. 3. The manager 11 divides the control of integrating negotiable instruments into three modules to enable various combinations of negotiable instruments to be formed using system 10. The three modular units are background manager 21, signature manager 22 and information manager 23, each providing a distinct function in generating the digital image that is formed to print check 40. The background manager 21 here creates an electronic pixel or dot pattern of the background 42 for a negotiable instrument such as check 40 of FIG. 4. Signature manager 22 provides a unique way to generate protection for a validating signature 43 on check 40. Finally, information manager 23 assimilates all other information present on check 40, such as amount 46, which also uses a secure font described in detail later.

It will be appreciated that alternatively the function of the integration manager 11 et al. may be performed by software in the workstation 12. That is, the image generation system can be provided by using a personal computer, with available software. Note especially FIGS. 11 and 12. For example, an IBM PC AT or the like, having a mouse and a color VGA monitor and operating CorelDRAW Version 3.0 graphics design software, Corel Corporation, 1992, and Elixir forms-creation software, a description of which is found in the above-cited references to the Xerox Printing Productivity Series: Elixir Edition for Highlight Color, User Guide for ElixiForm/ElixiSys Version 2.10; Elixi-Graphics Version 2.10a; and ElixiFront Version 1.0 publication numbers 720P60700, 720P60691 and 720P82890, by Xerox Corporation, currently dated August 1991, March 1992 and June 1989, respectively. Elixir is an interactive software design tool that enable a user to create forms, custom fonts and the like for use with a highlight color printer. Forms include elements such as lines, boxes, text and images, all of which can have highlight color attributes. The static data can subsequently be merged with variable data for printing on color-compatible printers using a known Forms Source Language (FSL). In a similar manner to the other described embodiment herein, steps taken to generate a digital representation of check 40 are shown in detail in FIGS. 11 and 12.

Specifically, FIG. 11 refers to steps taken using Corel Draw 3.0 and mouse selecting from its available displayed graphic options. The displayed menu selections include, for example, selections of image halftoning, patterning, rotation, copying, outlining, etc. Background 42 is initially created using step 110 wherein the background pattern 51 is first created. Forming a background pattern here includes creating two identical image outlines 54 in a similar manner to that described in FIG. 6, and filling them with halftone patterns having varying gradient density. These two partial images at this point are represented in different gray scales, where one image is to be represented using a highlight color and the other represented using black. The two partial images for example could be assigned a halftone area coverage with a varying gradient density of 30–25% for the highlight color image and 20–15% for the black image. The next step 111 optionally forms a latent image in the black image by embedding a warning word such as "VOID" within the halftone pattern by using a dark outline to form the latent image 53 while interlacing varying halftone densities that are not distinguishable to the human eye but sensitive to copying on electrophotographic reproduction machines. Subsequent to the step of forming a latent image in the black image, both images (highlight color and black) are blended with an overlay encoding 52 as indicated by step 112. Blended within the two images is an object such as an ellipse having text embedded therein. The blending of the text and object forms an uniquely encoded pattern that is overlayed in a clear and opaque fashion over the two images. It should be noted that these overlayed images can be positioned so that they appear in exactly the same pixel positions within the respective images, or offset by a number of pixels, both of which are deterrents to reproduction or alteration of the original. At step 113 an output file bitmap resolution is selected from which a Corel Draw graphical representation is resolved to bits at step 114. The resolved bitmaps for the two respective images may be stored in a TIFF (Tag Image File Format) file format.

Turning now to FIG. 12, this shows these Elixir software tools used to first convert files in a TIFF format to Elixir file format at step 120. At step 121 color is introduced to the converted image that is destined to be a highlight color. The two images (highlight color and black) are overlayed to form a composite background image 42 at step 222 and as shown in FIG. 5. Subsequently at step 123 graphics such as box 45 shown in FIG. 4, and text such as check name 47, are added to the composite image. In an independent series of steps, a validating signature 43 and a secure font 46 are formed. Forming validating signature 43 here includes the steps of scanning an original signature 124, converting the signature to an Elixir file format 125 if necessary, copying the scanned in signature 126 to form a second signature, adding unique halftone density patterns to both images (the copy and the originally scanned in image) and forming a composite signature 128 using the originally scanned in image and copy. Once a validating signature is formed, step 132 merges the validating signature 43 to the composite image 40 as shown in FIG. 4. Forming secure font 46 includes the steps of converting a known font to a generic font 129, editing the generic font 130 which includes making a copy and applying a pattern and naming the font 131 for later reference. In a final step 133, fixed data comprising a form composite image 40 that includes background image 40, validating signature 43 and any text or graphics, and secure font 46 are loaded onto printer 15 for later merging with variable data at print time, as described below.

Referring now again to the alternative system of FIG. 3, background safety paper manager 21 here is composed of three services, which work sequentially or in parallel to generate composite safety background 42, as shown in detail in FIG. 5. The pattern service 24, overlay encoding service 25 and latent image service 26 supplement the safety background image on check 40 by generating background pattern 51, overlay encoding 52 or latent image 53, respectively. After generation of the composite background image 50, manager 21 stores the resulting image in background database 27 for later integration or use on an alternate check or negotiable instrument.

One process sequence background manager 21 may follow is shown in detail in FIG. 6. Pattern service 24 begins by selecting pattern information 60 that can be made up of shading, halftone patterns, scanned images or mathematically generated patterns (e.g., fractals). The pattern information is used in combination with density gradients 61 and 62 to define the intensity with which the pattern will appear across the image, an example of which is shown in FIG. 5. Two background images 63 and 64 are formed using matching patterns that have different gradients. Pattern service 24 therefore forms images 63 and 64 by applying gradients 61 and 62 respectively to pattern 60 which have in this example opposite direction and of varying intensity. The halftone pattern for example could vary on image 63 with one shade ranging from about 25-30% halftone area coverage from top to bottom, and vary on image 64 with a second shade varying from about 15-20% halftone area coverage from bottom to top. That is, as shown in FIG. 4, from one side of check 40 to the other, the intensity (pixel density) of one color is gradually increasing while that of the other color is decreasing, so that the two colors are both interdigitated and also relatively varying in density ratios, in a two-color protective background pattern extending over the check surface.

Overlay encoding service 25 is activated by background manager 21 to generate an encoded pattern 65 that is alternatively opaque and clear. The encoded background pattern could be randomly generated or fixedly determined by using an object such as an ellipse, repeated automatically and concentricly expanded, an example of which is shown in FIG. 5. A randomly generated pattern can be, for example, formed using an embedded code such as a sequence of alphanumeric characters that are distorted after being blended with a geometrical object such as a triangle. The blended object adds an additional level of complexity to the composite background 50 by unobviously introducing unique patterns that can be readily changed on demand by system 10 by varying the code word. Pattern 65 is then overlayed on top of images 63 and 64 to form images 66 and 67. The unique superimposed pattern may be almost invisible except on close inspection, and difficulty to reproduce or accurately copy.

Before merging or interposing the two images to form a composite image, image 66 desirably has additionally merged therewith a latent image. Latent images, per se, are well known, as discussed above. Here, latent image service 26, which is enabled by background manager 21, shades and patterns a sequence of alphanumeric characters similar to the manner with which pattern service 24 patterned image 61, in order that the two densities vary little enough to keep the latent word, such as "VOID" in FIG. 5, invisible to the human eye, but vary enough to cause copying machines to distinguish between the two densities upon reproduction, as taught by the cited prior art. The latent image for example may be written as a 3-5 mm wide semi-white line in the halftone patterned areas.

That is, the generation of the word "VOID" itself, or other such latent image 68, can be accomplished by adding a few black pixels in a pattern superimposed within the white spaces between the existing, variably mixed, black and other color [e.g., blue] pixel background pixel pattern. Since these added "VOID" black dots are intermixed with existing background black dots, they look somewhat larger and darker when the black pixels, especially those closely adjacent one another, are copied.

In addition, as noted, a "white area" may be provided around the latent word such as "VOID". This may be a border or outline area of about 0.14" (3.6 mm) or so wide around those added "VOID" character pixels, within which the software is removing some of the background black dots (but not the blue dots) from the background pattern just in these narrow white characters outlines areas. This further improves the "VOID" visiblity on unauthorized copies, especially at 300 dots per inch or more, even though on the original, one may not readily see this even under a magnifying glass.

After forming this latent image 68, it is merged with image 66 to form image 69. The two resulting compound images 69 and 67 are assigned one of two tri-level colors to be provided by printer 15. Image 69 is preferably black, and image 67 is preferably a high-light color, and they are merged to form a composite background electronic image 70 which is stored in background database 27. When the merged image 70 is printed (giving black priority over the second color) the latent image is not readily noticeable. However, as noted, it becomes much more so upon an attempted reproduction, since copiers have a tendency to enlarge black pixels more on the copies, making the latent image stand out as a much more dominant copied element.

With particular reference to FIG. 7, signature manager 22 uses the pattern service 24 to generate a validating signature 43 on check 40. Signature manager 22 first scans a desired signature (using a conventional scanner 14, as shown in FIG. 1) to form a digital signature 71. From signature 71 two digital images containing signature 71 are formed with a pattern and gradient set by pattern service 24. The gradients 75 and 76 can desirably repeat across the length of the selected image or image portion. They can repeat, for example, at each signature character separation, as shown at 43 in FIG. 4 and FIG. 10, or can be continuous, as shown by gradients 77 and 78. Once formed, signature images 72 and 73 are each assigned a color to be provided by printer 15 and merged to form signature image 74, which is stored in signature database 28 for later merging with the other elements of check 40. For example validating signature 43 is distributed at a first gradient density 75 using a color such as black, and intermixed therewith the same validating signature but at a second gradient density 76 (opposite to gradient 75) and with a color other than black. Accordingly the validating signature is expressed using intermixed colors at varying halftone pattern densities, different from the background, making it difficult to manually forge or alter.

Information manager 23 is responsible for assimilating and integrating onto one document, such as check 40, or the like, all text and graphics. The textual and graphical information are in turn divided into variable and fixed information. The textual information which is composed of alphanumeric characters may be based on well known fonts (such as "Modern") or custom fonts. Custom fonts or secure fonts are generated by font manager 30 and stored along with the known fonts in font database 31. With reference to FIG. 8, font manager 30 may, for example, invoke a custom font service 32 that selects a known font from font database 31 and copies it to an offset position to form image 80. The copied font in image 80 is then screened and merged with the known font to form a custom font 81, one example of which is shown in greater detail in FIG. 9. Alternatively each character of the custom font could have a varying background, which would further increase the difficulty with which the font is altered.

Once the custom fonts and the known fonts are stored in font database 31, variable and fixed information managers 33 and 34 store respective information in variable and fixed databases 35 and 36. The variable and fixed information can be composed of any graphical information generated through graphics service 37 or any textual information generated through font manager 30. With reference to FIG. 4, check 40 has various fixed alphanumeric and graphical information. For example the bank name and address as well as box 45 in which the amount 46 of the check is entered. Variable information on check 40 includes the amount 46 which is represented using a secure custom font, and name 47 to whom the check is paid using a known font, both of which are stored in font database 31 and accessed through font manager 30.

Subsequent to preparing all of the elements of check 40 in their respective databases, integration manager 11 sends non-variable information describing the check's fixed information that does not vary between multiple copies of a single check to the printer 15 in a known page form or document description language. The non-variable (or only occasionally varied) information here is made up of safety background 42 and other non-background information used to describe the negotiable information on check 40, the non-background information formed using custom or known fonts, graphics and a validating signature. The variable information resident in database 35 is streamed to printer 15 after the non-variable information has been loaded. Each digitally described check with variable information is then merged with the non-variable information. The resulting digitally integrated negotiable instrument or check is then printed using printer 15 which is capable of printing a highlight color image. The printer 15 here is capable of precisely interposing the latent image exposure dots of the plural color integral image effectively simultaneously on the photoreceptor belt 19 of printer 15 in precise registration with one another. Typically, printer 15 prints black and another color. As noted, it could also be set up to develop images using a MICR toner. Safety background 42 and the negotiable information here are all formed by a single two-level laser beam on the same document image area on photoreceptor belt 19. Consequently, these two different but interposed dot patterns of the integrated check image can be developed on a single pass of photoreceptor 19 past two differently biased developer stations 90 and 92, and then conventionally transferred in a single pass to a paper sheet simultaneously at transfer station 94. Thus the resulting check 40 has two varied and distinctly formed color patterns and density gradients that are printed simultaneously along with all other information on the check 40. This single two-color halftone printer 15 eliminates the need for pre-printed safety background paper, because the printer 15 has single pass "perfect registration" printing that can print everything on the instrument in one pass from a single merged image.

Since normal multiple pass color copiers do not have such perfect registration, attempted copier reproductions of these documents are readily identified by offset color patterns, or even color bands if the imaging or imaged surface velocity changes, or the copy paper shrinks, between passes.

Forgers will have difficulty manually restoring such a closely spaced dot background pattern of a varied ratio of two different, intermixed (interposed) colors with varied clear or "white spaces" (not print pixels) between these two differently colored pixels, which varied pixel interspacing ratios are due to the programmed density graduations of these two colors.

In summary, the disclosed embodiment provides a method and apparatus for printing negotiable instruments or any other secured documents on demand, which documents are resistant to reproduction and alteration. This is preferably accomplished by introducing elements into safety patterns that are generated in at least two interposed and varying color patterns, using mathematical functions or the like, and by enabling both the safety patterns and the information pertinent to the negotiable instrument to be integrally printed at the same site, with the same printer, in a single paper pass. Most significantly, given the image's digitally generated background and information, alterations to the background pattern, and/or a secure font, and/or to a validating signature, and security patterns thereof, can be made substantially in real time and on demand. The disclosed system provides an automated method which can randomly incorporate encoded and latent information with a background pattern that can be readily changed and readily printed on negotiable instruments.

Furthermore, unlike offset printing that embeds the safety background into a substrate, underneath the subsequently printed information, the present invention's background is integrated into the printed information, making it difficult to remove one without altering the other.

Furthermore, since the names, numbers and/or dollar amounts and "signature" or other alphanumeric information on the document may be printed with the same or chemically very similar xerographic toner (on the same pass) as the background pattern(s) in this system, and commonly fused onto the paper by the printer fuser, it would be difficult for a forger to find a chemical that would alter that information without also altering the superposed and integrated background pattern, since it is printed with the same or chemically very similar toner.

The present system is also fully compatible and integratable with systems for printing bar codes, or very fine, small, invisible or subliminal, digital "glyphs", or other digital encryptions into an image area. Such "glyph" patterns may look something like a very light and reduced "҉///\/\\", yet are machine readable. Any of the following Xerox Corporation U.S. patents describe basic glyph code, plus various decoding processes, which can be used herewith: U.S. Pat. Nos. 5,091,966; 5,128,525; and 5,168,147. [By way of background, also noted are Xerox Corporation U.S. Pat. No. 5,060,980 and Fuji Xerox U.S. Pat. No. 5,051,779.] As taught by the former, machine readable digital information may be encoded in the angular orientation and/or the geometric profiles of the disjoint "glyphs" of a self-clocking glyph code. Advantageously, the glyphs may be defined by pixel patterns that have approximately the same number of ON pixels and approximately the same number of OFF pixels, such that the code has a generally uniform texture (e.g., a generally uniform gray tone for higher density codes) when the glyphs are printed on substantially uniformly spaced centers. The number of ON pixels per glyph may equal the number of OFF pixels/glyph (that will provide an approximately 50% grayscale value), but a UNIFORM grayscale can be provided even if they do not. However, preferably all glyphs have essentially the same number of ON pixels (say, x ON pixels per glyph) and essentially the same number of OFF pixels (say, y OFF pixels/glyph). If both of those conditions are satisfied, a high density glyph code will have a uniform grayscale appearance, with the specific grayscale value being dependent on the ratio of the number of ON pixels/glyph to the total number of pixels per glyph i.e., $x/(x+y)$. Xerox Corporation U.S. Ser. No. 07/634,990, filed Dec. 27, 1990, "Methods and Means for Embedding Machine Readable Digital Data in Halftone Images", is on machine readable digital information encoded in the angular orientation of circularly asymmetric halftone dot patterns that are written into the halftone cells of digital halftone images. The "latent" digital information of the glyphs may be imbedded in security halftone patterns described herein which are also electronically generated. A glyph generator/converter 38 is schematically shown herein inter-connected into the system in FIG. 3. All the check information and additional information, such as hidden serial numbers, can be automatically converted to glyph code and automatically buried into the safety background pattern of the integrated document image.

With the present system, the entire security document, with both the safety background(s) and all unique alphanumeric information for that particular document, is automatically printed at one time, in one printing pass of the paper or other substrate, without any human interaction, and without requiring pre-printed safety paper and/or pre-printed forms.

Obviously, the present system does not relieve users thereof of the necessity for maintaining strict control and security, including password access, over the particular background and information security patterns generated in software and currently in use, as well as the tape or disk backups of these and the merged document images. However, the present system allows all document security image patterns and information to be easily and rapidly changed. Accordingly, these changes may be made frequently and without delaying printing, since they do not require new security paper supplies. As is well known, frequent security changes are axiomatic for good security systems.

While the embodiment disclosed herein is preferred, it will be appreciated from this teaching that various alternatives, modifications, variations or improvements therein may be made by those skilled in the art, which are intended to be encompassed by the following claims:

What is claimed is:

1. A plural-color printing system for printing plural color security documents with a printed image resistant to reproduction or alteration with an electronic printer printing an integrated image of the security document in a single pass, said single-pass electronic printer being controlled for said forming of said integrated security document image by an image generation system which electronically generates a safety background image pattern with at least a first color pattern and a second color pattern, said first color pattern being interposed with said second color pattern to form an interposed plural color pattern, and said image generation system further providing and electronically merging alphanumeric information interposed with said safety background image pattern for said printer to print said integrated image security document in a single pass.

2. The plural-color printing system for printing plural color security documents of claim 1, in which said single pass electronic printer comprises an imaging surface upon which latent images of said first and second color patterns are interposed and then separately developed with two differently colored developer materials to form a print image which is simultaneously transferred to a substrate to produce said integrated image security document.

3. The plural-color printing system for printing plural color security documents of claim 2, wherein said alphanumeric information is printed with at least one of said two differently colored developer materials.

4. The plural-color printing system for printing plural color security documents of claim 1, wherein said first and second color patterns are differently varying density patterns of electronically generated pixel dot images with varying spaces therebetween for tamper resistance and copying detection assistance.

5. The plural-color printing system for printing plural color security documents of claim 1, wherein said safety background image includes interdigitated halftone patterns of said first color and said second color, and said alphanumeric information comprises at least one of said first or second colors.

6. The plural-color printing system for printing plural color security documents of claim 1, wherein at least a portion of said alphanumeric information is formed by a special secure font that is resistant to alteration.

7. The plural-color printing system for printing plural color security documents of claim 1, wherein said alphanumeric information includes an electronically varied halftone patterned signature reproduction.

8. The plural-color printing system for printing plural color security documents of claim 1, wherein said integrated image further includes a validating signature printed on two intermixed halftone color patterns with a varying density gradient which is varying across said validating signature.

9. The plural-color printing system for printing plural color security documents of claim 1, wherein said background image pattern is merged with at least part of said alphanumeric information to break up said alphanumeric information into a finely interdigitated pattern of colored dots and varying spaces of at least two different colors in varying ratios of color dots to spaces to provide different color densities.

10. The plural-color printing system for printing plural color security documents of claim 1, wherein said first and second color patterns provide two interdigitated patterns of different colors varying in opposite directions in color densities within one another.

11. The plural-color printing system for printing plural color security documents of claim 1, wherein said integrated image includes at least two intermixed color halftone patterns of variable density, with each color halftone pattern having a density gradient in a different direction from the other.

12. The plural-color printing system for printing plural color security documents of claim 11, wherein there is printed a signature interposed in said plural color halftone patterns having different said plural color density gradients than said background image pattern.

13. The plural-color printing system for printing plural color security documents of claim 1, wherein a low halftone density copy of selected said alphanumeric information is printed on said security document adjacent to a high density print of said same alphanumeric information.

14. The plural-color printing system for printing plural color security documents of claim 1, wherein said background pattern comprises a first color halftone pattern varying between approximately 25% to 30% in halftone area coverage, and a second color halftone pattern interposed therein varying between approximately 15% to 20% in halftone area coverage.

15. The plural-color printing system for printing plural color security documents of claim 14, wherein said first color halftone area coverage varies in one direction and said second halftone area coverage varies in the opposite direction.

16. The plural-color printing system for printing plural color security documents of claim 1, wherein superimposed in said safety background image pattern is a latent image pixel pattern which is substantially invisible on said printed security document but which pixel pattern is emphasized by and becomes visible by reproduction on a normal copier.

17. The plural-color printing system for printing plural color security documents of claim 1, wherein there is additional provided a special font providing a low density shadow copy of selected said alphanumeric information.

18. The plural-color printing system for printing plural color security documents of claim 17, wherein said selected alphanumeric information is the currency value amount of a negotiable instrument.

* * * * *